(12) United States Patent
Naydonov

(10) Patent No.: US 10,673,786 B2
(45) Date of Patent: Jun. 2, 2020

(54) ARTIFICIAL INTELLIGENCE SYSTEM FOR AUTOMATICALLY GENERATING CUSTOM TRAVEL DOCUMENTS

(71) Applicant: VisaHQ.com Inc., Washington, DC (US)

(72) Inventor: Oleg Naydonov, McLean, VA (US)

(73) Assignee: VISAHQ.COM INC., Washington, DC (US)

( * ) Notice: Subject to any disclaimer, the term of this patent is extended or adjusted under 35 U.S.C. 154(b) by 320 days.

(21) Appl. No.: 15/391,230

(22) Filed: Dec. 27, 2016

(65) Prior Publication Data

US 2018/0183735 A1 Jun. 28, 2018

(51) Int. Cl.
| | |
|---|---|
| *H04L 12/28* | (2006.01) |
| *H04L 12/58* | (2006.01) |
| *H04L 29/08* | (2006.01) |
| *G06N 3/00* | (2006.01) |

(52) U.S. Cl.
CPC ............ *H04L 51/02* (2013.01); *G06N 3/006* (2013.01); *H04L 51/046* (2013.01); *H04L 67/14* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 6,366,925 B1 | 4/2002 | Meltzer et al. | |
| 7,558,782 B2 | 7/2009 | Meltzer et al. | |
| 2001/0037265 A1 | 11/2001 | Kleinberg | |
| 2011/0057029 A1* | 3/2011 | Daniel | G06K 17/00 235/380 |

(Continued)

FOREIGN PATENT DOCUMENTS

| | | | |
|---|---|---|---|
| CN | 105138505 A | * | 12/2015 |
| CN | 108763336 A | * | 11/2018 |

(Continued)

OTHER PUBLICATIONS

PCT International Search Report and Written Opinion of the International Searching Authority dated Mar. 8, 2018, International Application No. PCT/US17/67789, pp. 1-12.

*Primary Examiner* — Natisha D Cox
(74) *Attorney, Agent, or Firm* — Resolute Legal PLLC

(57) ABSTRACT

Artificial intelligence systems and methods are disclosed. In accordance with aspects of the present disclosure, an artificial intelligence system can automatically generate a travel document using a chatbot. In implementations, the artificial intelligence system performs operations including monitoring messaging sessions of users communicatively connected to the messaging system. The operations also include conversing with a user based on one or more keywords used in the messaging session by the user. The operations further include determining, by conversing with the user, that a destination of the user involves a travel document. Additionally, the operations include obtaining, by interviewing (Continued)

the user, information for a localized profile of the user corresponding to the destination, wherein the questions used during the interview are selected by the artificial intelligence system based on the localized profile. Moreover, the operations include generating the travel document using the localized profile and providing it to the user.

20 Claims, 5 Drawing Sheets

(56) References Cited

U.S. PATENT DOCUMENTS

| | | | |
|---|---|---|---|
| 2012/0016678 A1* | 1/2012 | Gruber | G06F 9/54 704/275 |
| 2012/0059896 A1 | 3/2012 | Li | |
| 2013/0007648 A1* | 1/2013 | Gamon | G06Q 10/107 715/771 |
| 2013/0110518 A1* | 5/2013 | Gruber | G10L 15/22 704/275 |
| 2013/0268260 A1* | 10/2013 | Lundberg | G06F 17/28 704/8 |
| 2013/0275164 A1* | 10/2013 | Gruber | G10L 17/22 705/5 |
| 2014/0058967 A1* | 2/2014 | Luong | G06Q 50/26 705/325 |
| 2014/0341369 A1 | 11/2014 | Chang et al. | |
| 2015/0286943 A1* | 10/2015 | Wang | G06F 3/04842 706/11 |
| 2015/0310446 A1 | 10/2015 | Tuchman et al. | |
| 2016/0112362 A1* | 4/2016 | Perazzo | H04L 51/18 455/466 |
| 2017/0011383 A1* | 1/2017 | Melzer | G06Q 10/10 |
| 2017/0242852 A1* | 8/2017 | Clain | G06F 9/451 |
| 2017/0249592 A1* | 8/2017 | Rossi | G16H 10/60 |
| 2018/0181922 A1* | 6/2018 | Choi | G06Q 10/1097 |

FOREIGN PATENT DOCUMENTS

| | | | |
|---|---|---|---|
| TW | 200823793 A | * | 6/2008 |
| TW | 200823793 A | * | 6/2008 |
| TW | 200823793 A | * | 6/2008 |

* cited by examiner

User Profile Info
~500

| User ID | Citizenship | Residence | PI-1 | PI-2 | PI-3 | ... | PI-N |
|---------|-------------|-----------|------|------|------|-----|------|
| 00001 | IN | US | | | | | |
| 00002 | US | US | | | | | |
| ... | ... | ... | | | | | |
| 0000n | US | | | | | | |

FIG. 5

Localized User Profiles
~600

Destination AAA

| User ID | Citizenship | Residence | Local Info 1 | Local Info 2 | ... | Local Info X |
|---------|-------------|-----------|--------------|--------------|-----|--------------|
| | | | PI-2 | | | LI-X |
| 00001 | US | PI-3 | | | | |

FIG. 6

ARTIFICIAL INTELLIGENCE SYSTEM FOR AUTOMATICALLY GENERATING CUSTOM TRAVEL DOCUMENTS

BACKGROUND

Instant messaging ("IM") and chat rooms have become common ways for parties to communicate online. IM and chat rooms allow parties to have real-time or near real-time conversations via computers linked by communication networks, such as the Internet. IM and chat rooms were previously limited to transmitting text messages. These messaging services have evolved to transmit other types of information (e.g., documents, hyperlinks, audio, and video), and can include graphic environments (e.g., virtual conferences, augmented reality services, and immersive online worlds), and social networking systems.

A chatbot is an artificial intelligence that can participate in IM and chat room conversations. Because chatbots can converse using natural language, their messages can be substantially indistinguishable from those of a human. As a result, chatbots can unobtrusively provide value-added services (e.g., weather, location, news, calculators, dictionaries, and the like) to parties in IM and chat room conversations.

SUMMARY

Artificial intelligence systems and methods are disclosed. In accordance with aspects of the present disclosure, an artificial intelligence system can automatically generate a travel document using a chatbot. In implementations, the artificial intelligence system performs operations including monitoring, via the chatbot, messaging sessions of users communicatively connected to the messaging system by client devices via a communication network. The operations also include determining to converse with a first user based on one or more keywords used in the messaging session of the user. The operations further include determining, by conversing with the user via the chatbot, that a destination of the user involves a travel document. Additionally, the operations include obtaining, by interviewing the first user via the chatbot, information of a localized profile of the first user corresponding to the destination, wherein questions provided to the first user during the interview are selected by the artificial intelligence system based on entries in the localized profile. Moreover, the operations include generating the travel document using the localized profile and providing the travel document to the first user.

DRAWINGS

The present invention will become more fully understood from the detailed description and the accompanying drawings, wherein:

FIG. 5 shows table illustrating an example of a data structure in accordance with aspects of the present disclosure.

FIG. 6 shows table illustrating an example of a data structure in accordance with aspects of the present disclosure.

DETAILED DESCRIPTION

Figure 1:
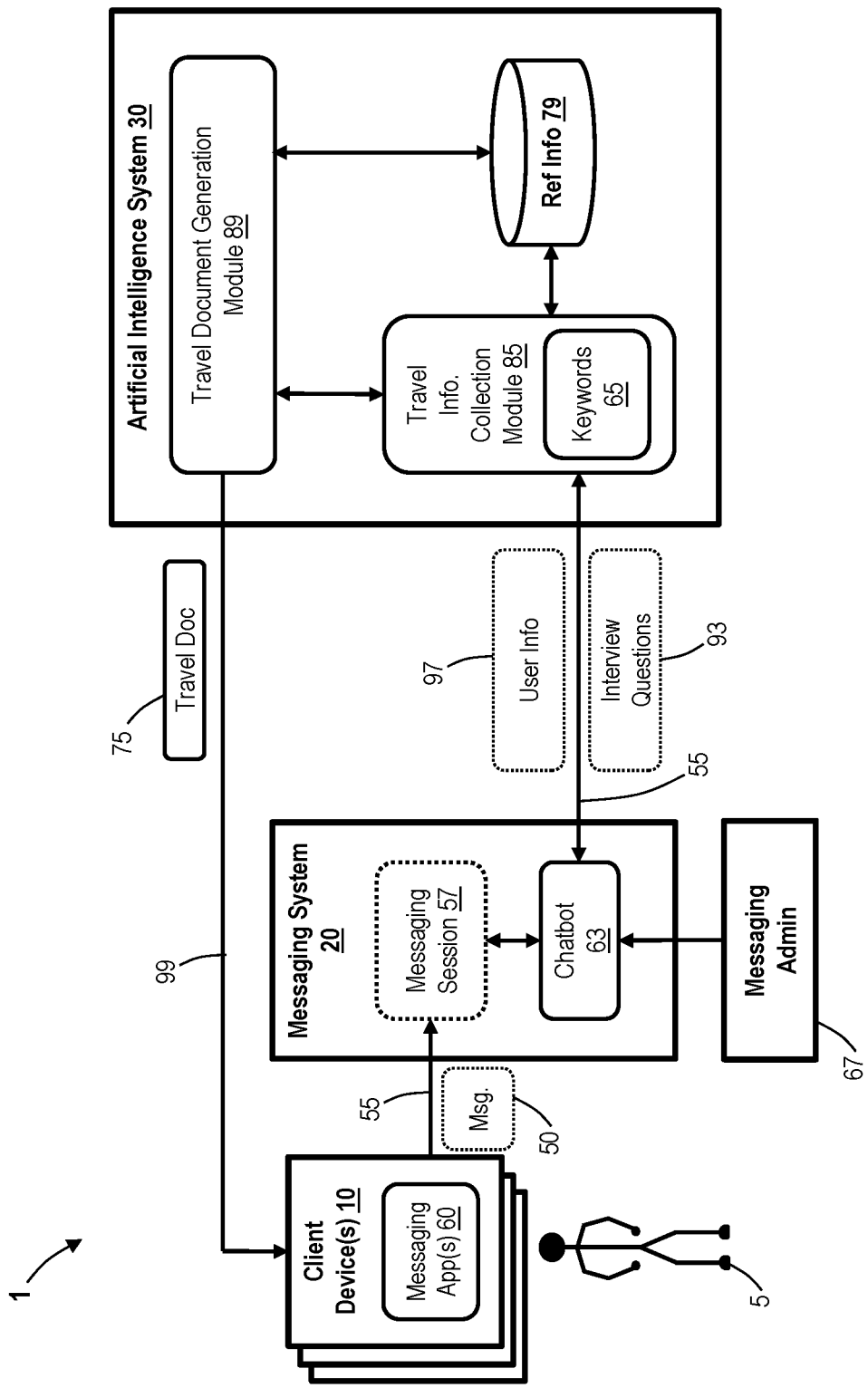
FIG. 1 shows a system block diagram illustrating an example of an environment for implementing systems and processes in accordance with aspects of the present disclosure.

The present disclosure is generally directed to artificial intelligence systems and methods that provide interrogative user interfaces and produce custom documents. More particularly, the present disclosure is directed to an artificial intelligence system that can interview a party using a messaging system to automatically generate custom travel documents (e.g., visa applications, including printed tangible documents). In accordance with aspects of the present disclosure, a chatbot component of an artificial intelligence system can be installed on and remotely and/or independently executed by a messaging system (e.g., IM or chat session). The chatbot can monitor conversations at the messaging system and selectively intervene in conversations involving travel plans. Using the chatbot, the artificial intelligence system can interview a user to collect user information and travel plan information, determine whether the user requires a travel document for a particular destination, generate the travel document, and provide the travel document to the user. For example, an individual participating in an online conversation via a messaging system may send a message describing travel plans to a foreign country (e.g., while chatting with an acquaintance or a travel agent). The chatbot, executed by the messaging system, monitoring the conversation may intelligently detect certain combinations of keywords (e.g., using natural language processing) and, in response, can initiate a conversation with the individual to determine whether her/she requires a travel visa. Based on the destination and information maintained by the artificial intelligence system (e.g., a user profile and pre-established information about the destination), the artificial intelligence system can intelligently and selectively interview the individual using the chatbot to complete a localized profile containing a subset of elements of the user profile required for the destination. Once the information in the localized profile is sufficient to complete the travel document, the artificial intelligence system can generate the travel document using the information in the localized profile, and provide the travel document to the individual.

Advantageously, in situations in which the user terminates the conversation with the chatbot before the localized profile or user profile is sufficiently complete (e.g., due a lack of time), the chatbot may monitor future conversations in the messaging system, identify or recognize the user who may communicate using the same or a different client device, and offer to resume the interview in a subsequent conversation. Thus, unlike current conventional travel systems, the artificial intelligence system disclosed herein can use the chatbot to disengage from an interview of the user and automatically reengage with the user at a later time. By doing so, the interview can be completed over several sessions at the convenience of the user, while involving little or no effort from the user to reconnect with the system.

Additionally, in situations in which a user is visually impaired, the chatbot may interview the user entirely via spoken conversation. Thus, the artificial intelligence system disclosed herein can use the chatbot to perform one or more interview for generating travel documents (e.g., a tangible paper document) for visually impaired users without involving the use of a graphic user interface.

Moreover, implementations of the artificial intelligence system consistent with the present disclosure can use the chatbot to identify particular users for an interview, customize the interviews to limit them to obtain particular information related to the users' particular travel destination, and automatically generate travel documents customized to the users for the particular travel destination. Thus, in comparison with current conventional travel systems that present a user with an entire form to manually complete through, e.g., an Internet browser, implementations of the artificial intelligence system consistent with the present disclosure use the chatbot to complete forms for the users, which greatly reduces the user's burden. Additionally, by doing so, implementations of the artificial intelligence system consistent with the present disclosure minimize the burden placed on computing resources by reducing processing power, network usage, and storage required to transmit and render entire forms online via an Internet browser.

Reference will now be made in detail to specific implementations illustrated in the accompanying drawings and figures. In the following detailed description, numerous specific details are set forth to provide a thorough understanding of the invention. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

FIG. 1 shows a block diagram illustrating an example of an environment 1 for implementing systems and processes in accordance with aspects of the present disclosure. The environment 1 can include a user 5, one or more client devices 10, a messaging system 20, and an artificial intelligence system 30. The user 5 can be any entity that generates one or more messages 50, for communication to one or more other entities via the client device 10. For example, the user 5 can be an individual, a business, an organization, or a computing device that generates and/or provides the messages 50. The client device 10 can be a computing system that is communicatively connected (directly or indirectly) to the messaging system 20 and/or the artificial intelligence system 30 via one or more communication channels 55. In various implementations, the client device 20 can be a personal computer system, a handheld or laptop device, a set top box, or other programmable user electronics that executes a messaging application 60 (e.g. a messaging client), which provides an interface, such as a graphic user interface, with which the user 5 perceives (e.g., views and enters) messages 50 that are received and sent using the messaging system 20.

The user message 50 can include text (e.g. an American Standard Code for Information Interchange (ASCII) character set or the like) or information convertible into text (e.g., via voice transcription), which can be communicated over the communication channel 55. The message 50 can be for example, a real-time text (e.g., text transmitted to a receiver's device at substantially the same time the text is entered into a sender's device) or a real-time message (e.g., messages transmitted to a receiver's device at substantially the same time the text is entered into a sender's device). The communication channel 55 can include one or more data links and/or a communication networks, such as a local area network, a wide area network, or the Internet.

The messaging system 20 can be one or more computing devices that provides messaging services, such as instant messaging service, a chat service, or the like. In implementations, the messaging system 20 can be provided by a telecommunications service provider, an online social network provider, or an Internet service provider. The entity operating the messaging system can be independent from the entity operating the artificial intelligence system 30. The messaging system 20 can include one or more server computers that host and/or relay communications between the user 5 and other users. For example, the messaging system 20 can be one or more relay servers of a multimedia messaging service ("MMS") or a short messaging service ("SMS"). The messaging system 20 can also be, for example, one or more computing systems that hosts a chat website (e.g., GOOGLE HANGOUTS™ by GOOGLE, INC. of Mountain View, Calif.). The messaging system 20 can also be one or more computing systems that provide an online virtual world (e.g., SECOND LIFE™ by LINDEN LABS of San Francisco, Calif.). The messaging system 20 can also be an Internet website that collects user information as part of its service. For example, the messaging system 20 can be operated by a travel planning service (e.g., EXPEDIA, INC. of Bellevue, Wash.) that plans and schedules travel itineraries that may include a destination requiring the user to possess certain documents (e.g., a travel visa). Such a travel planning service may activate a chatbot 63 that interacts with the artificial intelligence system 30 and/or share user information with the chatbot 63. While several examples of the messaging system 20 are provided above for the sake of example, it is understood that other types of communication systems (e.g., voice response systems and/or augmented reality systems) can be used in implementations consistent with the present disclosure.

In implementations, the messaging system 20 provides one or more messaging sessions 57 between the user 5 and one or more other parties. For example, the messaging system 20 can provide a messaging session 57 through which the user 5 communicates with one or more other users via a messaging application 60 executed by the client computer 10. The one or more other users can be addressees of the messages 50 or they can be subscribers to messages of the user 5. Additionally, the messaging system 20 can execute the program code of the chatbot 63, which can be provided (directly or indirectly) by an operator (not shown) of the artificial intelligence system 30 to the messaging system 20. In some implementations, a messaging administrator 67 associated with the messaging system 20 must enable the chatbot 63 to be active in the messaging system 20 and/or participate in a messaging session 57. For example, the messaging administrator 67 may enable the chatbot 63 after receiving consent from users of the messaging system 20 to monitoring or after receiving a request for activation from the artificial intelligence system 30 and/or its operator.

The artificial intelligence system 30 can be one or more computing devices that interactively converses with users (e.g., user 5) via a communication system (e.g., messaging system 20) to generate customized travel documents (e.g., a travel document 75) using user information and travel information collected via the chatbot 63. In various implementations, the travel document 75 is unique because it contains information applicable or relevant only to the user 5. The operator of the artificial intelligence system 30 can be, for example, an entity that provides passports and visas using reference information 79. In implementations, the travel document 75 corresponds to a particular travel destination and contains information pertaining to a particular user and other information particular to the destination. In implementations, the travel document 75 can be an application for a travel paper of a particular locality, such as a country that requires the user 5 to obtain a travel visa based, e.g., on his/her citizenship. In various implementations the travel document 75 may be provided in tangible form or electronically. The user 5 may print out an electronically provided travel document 75 to produce a physical travel document 75.

The artificial intelligence system 30 comprises one or more computer programs that use can us logical rules and/or heuristic rules to determine and select interview questions for the chatbot 63 such that the interview questions elicit the information needed to create a specific travel document(s) 75. In implementations, the artificial intelligence system 30 can use natural language processing to hold conversations (via text and/or speech) with users of the messaging systems 20 (e.g., IBM WATSON™ by INTERNATIONAL BUSINESS MACHINES INC., of Armonk, N.Y., and natural language processing by OPENAI.COM). The natural language processing performed by the artificial intelligence system 30 can be adapted to interpret conversations in the context of travel planning.

The artificial intelligence system 30 can also include one or more software modules, including a travel information collection module 85 and a travel document generation module 89. The travel information collection module 85 can be communicatively and functionally linked to the chatbot 63 via one or more of the communication links 55. In implementations, the chatbot 63 can be a remote service of the travel information collection module 85 executed by the messaging system 20.

The travel information collection module 85 includes program instructions for automatically generating interview questions 93 and providing them to the chatbot 63, and for receiving user information 97 from the chatbot 63. In implementations, the travel information collection module 85 receives information interpreted from user messages using natural language processing techniques. Based on such information, the travel information collection module 85 can generate interview questions 93 formatted using natural language techniques such that the chatbot 63 provides the interview questions 93 in a conversation with the user 5. In implementations, the conversation can be carried out entirely via text, entirely via speech, or using a combinations of text, speech, and other computer-user interfaces.

For example, the chatbot 63 can monitor the messaging session 57 for a set of keywords 65 or combinations of such keywords that have been predefined by the artificial intelligence system 30. Certain keywords in the set may trigger the chatbot 63 to intervene in the messaging session 20 and begin conversing with the user 5 in the messaging session 57. For example, various predetermined combinations of words may indicate that the user 5 plans to travel to Russia and, therefore, may need to apply for travel documents. By monitoring the messaging session 57, the chatbot 63 can be triggered to start a conversation with the user 5 (e.g., "Would you like assistance applying for a travel visa to Russia?"). After the user 5 engages in the conversation, the travel information collection module 85, via the chatbot 63, can determine whether the user 5 needs to apply for travel documents and, if so, can collect information from the user 5 to generate a complete travel document application. In accordance with implementations consistent with the present disclosure, the user information 97 can include one or more of the following pieces of information describing the user 5: name, aliases, social security number, nationality, citizenship, physical description (e.g., height, weight, gender, etc.), data of birth, age, contact information, residence, destination, travel dates, travel purpose (e.g., business or vacation), and so on. In performing the conversation with the user 5, the travel information collection module 85 can access a library of reference information 79 to obtain previously stored or pre-established information about the user 5, pre-established information about the destination, and the forms (e.g., applications) for travel documents corresponding to the destination.

The travel document generation module 89 includes program instructions for automatically generating travel documents, such as the travel document 75, for the user 5 based on the user information 97 obtained from the user by the chatbot 63 and the reference information 79 of the artificial intelligence system 30. After generating the travel document 75, the travel document generation module 89 can transmit the travel document to the user 5 through a communication channel 99, without passing through the messaging session 57 and or the messaging system 20. In some implementations, the communication channel 99 can be an electronic communication channel such as those described previously herein (e.g., communication channel 55), and the travel document can be an electronic document transmitted directly to the user via the communication channel 99.

Figure 2:
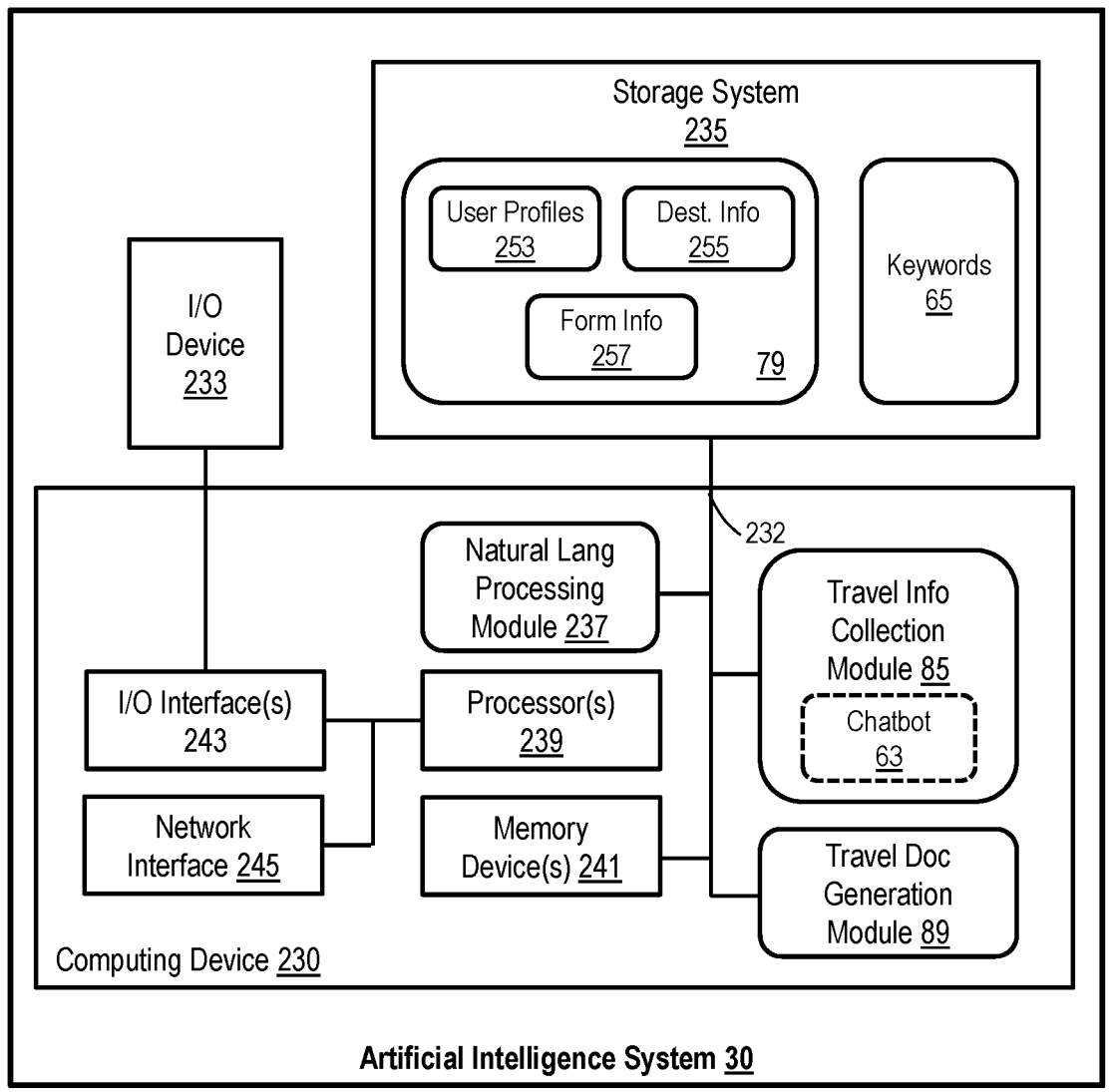
FIG. 2 shows a block diagram illustrating an example of an artificial intelligence system in accordance with aspects of the present disclosure.

FIG. 2 shows a system block diagram illustrating an example of an artificial intelligence system 30, which can be the same or similar to that described above. The artificial intelligence system 30 includes hardware and software that perform the processes and functions disclosed herein. In implementations, the artificial intelligence system 30 is an online travel system that can provide travel documents to users via the Internet.

The artificial intelligence system 30 includes a computing device 230, an input/output (I/O) device 233, and a storage system 235. The I/O device 233 can include any device that enables an individual to interact with the computing device 230 (e.g., a user interface) and/or any device that enables the computing device 230 to communicate with one or more other computing devices using any type of communications link. The I/O device 233 can be, for example, a touchscreen display, pointer device, keyboard, etc.

The storage system 235 can comprise a computer-readable, non-volatile hardware storage device that stores information and program instructions. For example, the storage system 235 can be one or more flash drives and/or hard disk drives. In accordance with aspects of the present disclosure, the storage device 235 store keywords 65 and reference information 79, which can be the same or similar to those described previously herein. In implementations, the keywords 65 can include predefined words used in a bag-of-words model for natural language processing. The reference information 79 can be one or more databases including user profiles 253, destination information 255, and form information 257. The user profiles 253 can include general user profiles and localized profiles comprised of previously obtained user information. The destination information 255 can include information corresponding to laws, regulations, processes, requirements, and empirical information of different countries related to visiting or traveling to each country. The form information 257 can include templates and schema for visa applications.

In embodiments, the computing device 230 includes one or more processors 239 (e.g., microprocessor, microchip, or application-specific integrated circuit), one or more memory devices 241 (e.g., RAM and ROM), one or more I/O interfaces 243, and one or more network interfaces 145. The memory device 241 can include a local memory (e.g., a random access memory and a cache memory) employed during execution of program instructions. Additionally, the computing device 230 includes at least one communication channel 232 (e.g., a data bus) by which it communicates with the I/O device 233 and the storage system 235. The processor 239 executes computer program instructions (e.g., an operating system and/or application programs), which can be stored in the memory device 241 and/or storage system 235.

The processor 239 can also execute computer program instructions of a travel information collection module 85 and a travel document generation module 89, which can be the same or similar to those described previously herein. Moreover, as indicated by the hashed-lines, the travel information collection module 85 can include a chatbot 63, which can be provided (e.g., downloaded) to a messaging system (e.g., messaging system 20) for remote execution. Further, the processor 239 can execute computer program instructions of a natural language processing module 237 (e.g., IBM WATSON™ by INTERNATIONAL BUSINESS MACHINES INC., of Armonk, N.Y., and natural language processing by OPENAI.COM), which can be adapted to interpret information directed to travel planning.

It is noted that the computing device 230 can comprise any general-purpose computing article of manufacture capable of executing computer program instructions installed thereon (e.g., a personal computer, server, etc.). However, the computing device 230 is only representative of various possible equivalent-computing devices that can perform the processes described herein. To this extent, in embodiments, the functionality provided by the computing device 230 can be any combination of general and/or specific purpose hardware and/or computer program instructions. In each embodiment, the program instructions and hardware can be created using standard programming and engineering techniques, respectively.

Figure 3:
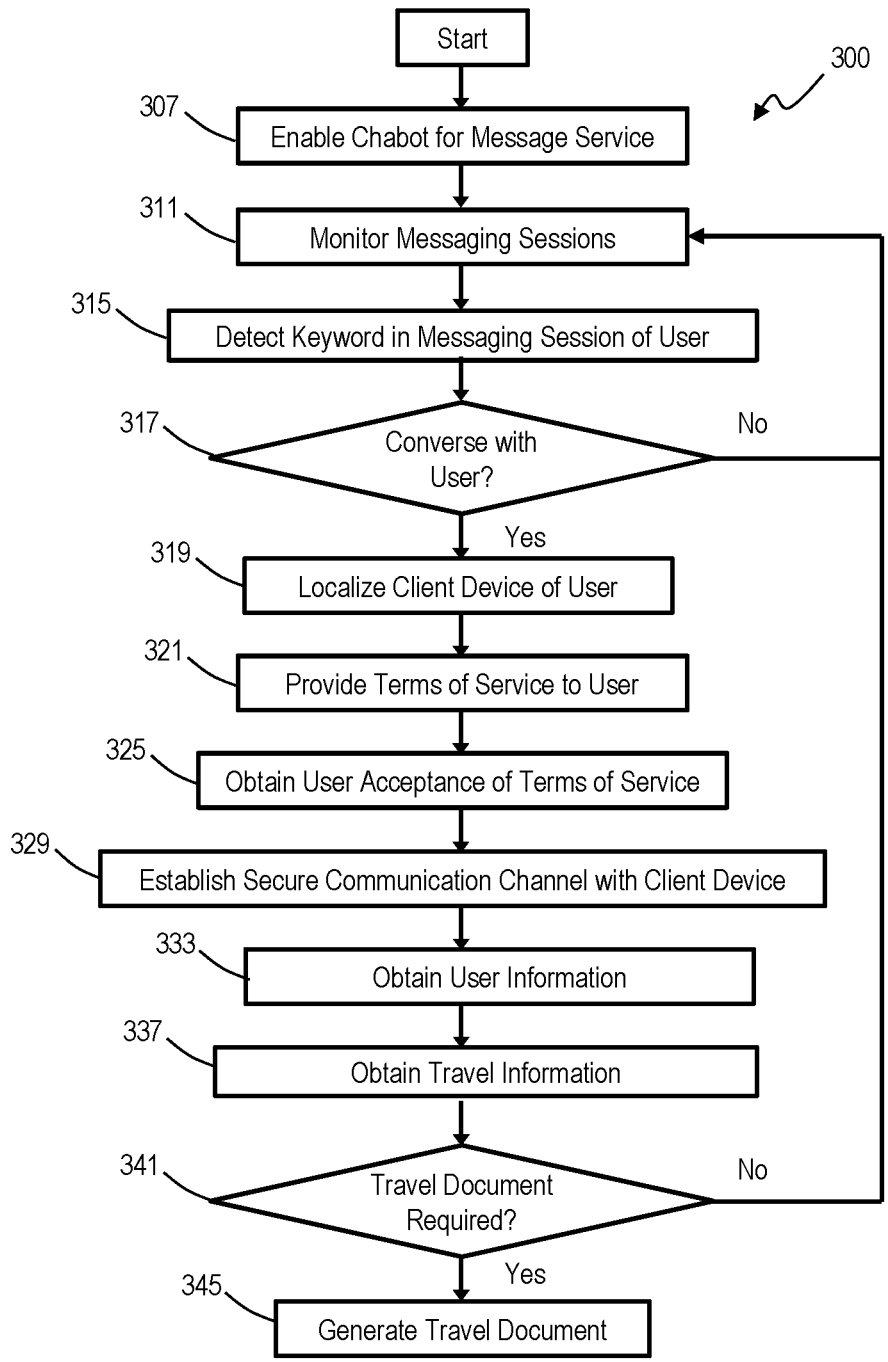
FIG. 3 shows a flow block diagram illustrating an example of a process in accordance with aspects of the present disclosure.
Figure 4:
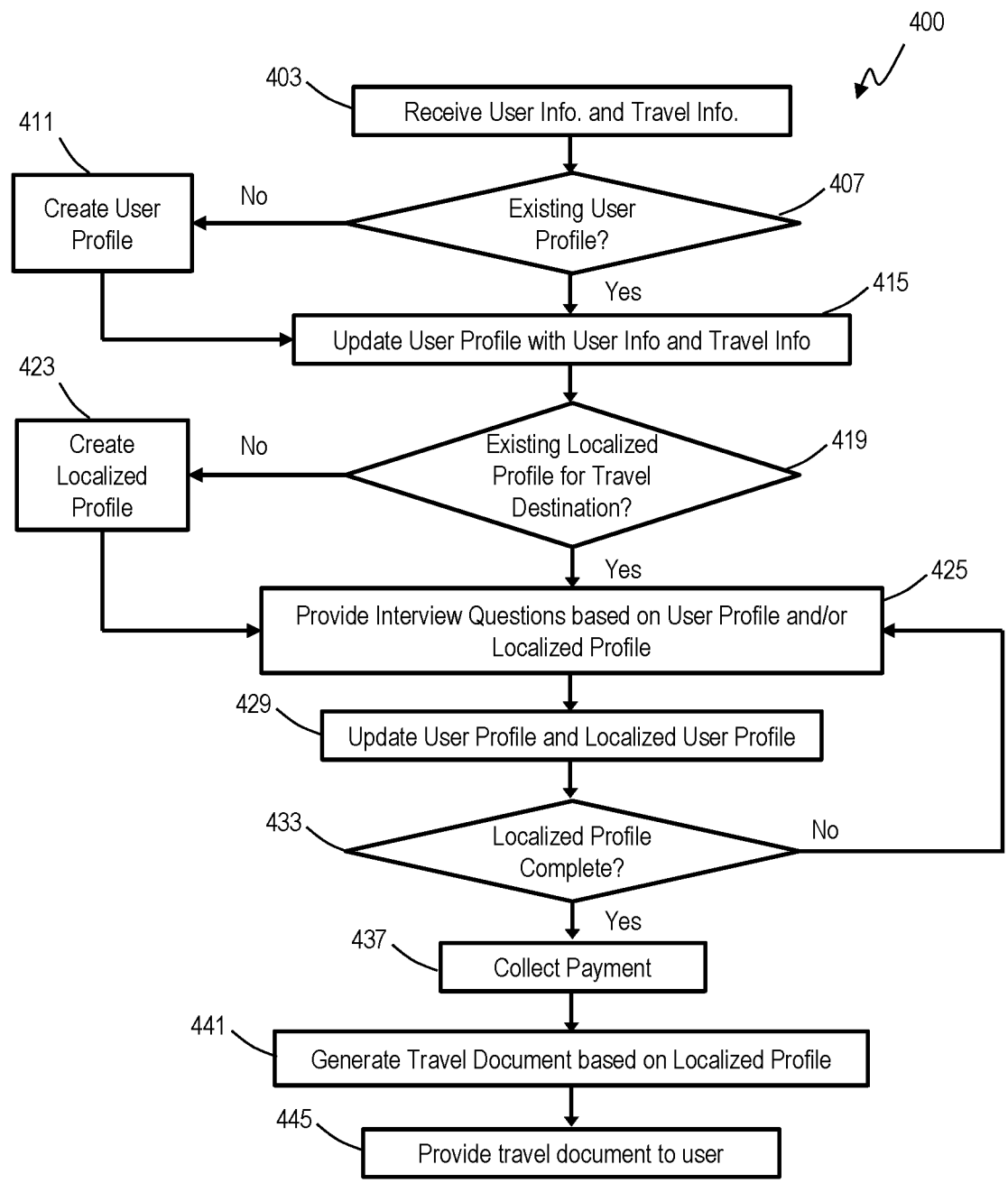
FIG. 4 shows a flow block diagram illustrating an example of a process in accordance with aspects of the present disclosure.

The flow diagrams in FIGS. 3 and 4 illustrate examples of the functionality and operation of possible implementations of systems, methods, and computer program products according to various implementations consistent with the present disclosure. Each block in the flow diagrams of FIGS. 3 and 4 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 3 and 4. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 3 shows a flow block diagram illustrating an example of a process 300 for providing documents in accordance with aspects of the present disclosure. At 307, a chatbot (e.g., chatbot 63) of a system (e.g., artificial intelligence system 30) is enabled to monitor a message service (e.g., a service provided by messaging system 20). For example, an administrator of the messaging service (e.g., messaging admin 67) can activate the chatbot provided by the system 30 based on consent given by users of the messaging service. At 311, via the chatbot, the system monitors messaging sessions of the messaging system, such as a messaging session (e.g., messaging session 57) of a particular user (e.g., user 5). For example, the system can use natural language processing (e.g., natural language processing module 237) to interpret messages transmitted in the messaging session. At 315, the chatbot detects predefined keywords in the messaging session of the user monitored at 311. For example, using a bag-of-words model, the chatbot or the system can perform natural language processing on text in messages sent to/from the user to determine that the user may be planning to travel to a foreign country.

At 317, the system determines whether or not to converse with the user based on the monitoring at 311 and/or the detection at 315. If the system determines not to converse with the user (i.e., 317, "No"), then the process 300 iteratively returns to 311 and continues to monitor. If the system determines to converse with the user, e.g., because the user seems to be planning foreign travel, then the process 300 proceeds to 319. In some implementations, the system can make the determination of whether to converse based on a combination of keywords within a particular distance within messages (by word count or sentence count). In implementations, the system can make such determination by detecting one or more words from each of the following groups being used within a distance of three sentences: (1) a travel term (e.g., "travel," "fly," "sail," "drive," "leave," "vacation," etc.), (2) a country name (e.g., "Afghanistan," "Algeria," "Angola," "Azerbaijan," etc.], and (3) a time frame (e.g., a month's name ("January," "February," etc.), a year number ("2017," "2018," etc.), or a term such as "month," "year," "semester," etc.). In other implementations, the system can use natural language processing (e.g., natural language processing module 237) to detect predetermined words or combinations of words and, based on the frequency and/or distance of such words, determine a running confidence score for the user. When the confidence score exceeds a predetermined threshold (e.g., 90%), the system can determine to converse with the users. Thus, in accordance with aspects of the present disclosure, the system conserves computing resources (e.g., processing, storage, and network bandwidth) by limiting its intervention in conversations to only those messaging sessions in which users are likely to need travel documents.

At 319, the system localizes a client device (e.g., client device 10) of the user. The localization determines the approximate geographic position of the client device. In some implementations, the position can be determined indirectly. For example, based on an IP address of the client device. Additionally, the position can be determined directly. For example, the chatbot can request the position from the client device or the user.

At 321, via the chatbot, the system provides terms of service to the user and, at 325, obtains user acceptance of the terms of service. The particular terms of service can be based on the location determined at 319. At 329, via the chatbot, the system can establish a secure communication channel with client device to prevent disclosure of personal information that may be disclosed when exchanging information for a travel document. For example, chatbot can create a new messaging session with the client device of the user using an encrypted communication protocol. Thus, other users that the traveling user was initially chatting with cannot see the traveling user's answers to the chatbot's subsequent questions.

At 333, via the chatbot, the system converses with the user to obtain user information. For example, using questions provided to the user via the chatbot, the system can ask the user one more questions that establish a substantially unique identity of the user (e.g., name, alias, social security number, nationality, citizenship, and/or date of birth, and the like). Additionally, via the chatbot, the system can request that the user provide biometric information, such as a photograph or a fingerprint obtained, e.g., via sensors included on a mobile phone or the like. At 337, via the chatbot, the system converses with the user to obtain travel information. For example, using questions provided to the user via the chatbot, the system can ask the user one or more questions about the destination (e.g., destination, travel dates, and travel purpose, and the like). At 341, the system determines, based on the response to the questions asked by the chatbot at 333 and 337, whether travel to the destination involves or requires a travel document (e.g., a travel document 75). For example, travel to certain countries may require that the user submit an application for a travel visa prior to traveling. If not (341, No), then the process 300 may iteratively return to monitoring messaging sessions at 311. On the other hand, if it is determined at 341 that a travel document is required (341, Yes), then the system generates a document at 345, such as an application for a travel visa, or the like.

FIG. 4 shows a flow diagram illustrating an example of a process 400 for generating travel documents in accordance with aspects of the present disclosure. In various implementations, the process 400 may be a continuation of the process described above with respect to FIG. 3. In the example shown, at 403, the system receives user identification and travel plan information from the user via the chatbot (e.g., FIGS. 3, 333 and 337.) At 407, the system determines whether a user profile exists for the user in the system (e.g., user profiles 353). For example, based on the user information obtained at 403, the system determines whether a user profile is already stored by the system (e.g., in the reference information 79). If not (407, No), then the system creates a user profile for the user at 411 and, at 415, updates the user profile with the user information and the travel information obtained at 403. On the other hand, if at 407 the system determines that a user profile already exits (407, Yes), then the process 400 proceeds directly to updating the user provide at 415.

At 419, the process 400 determines whether or not an existing localized profile for a destination is in the travel plan information received at 403. The localized profile contains elements of the user profile required for the destination received at 403. The elements of the localized profile can be determined based on pre-established information about the destination (e.g., destination information 255). If there is no existing localized profile (419, No), then at 423, the system creates a localized profile. On the other hand, if at 419 the system determines that a localized profile exists (419, Yes), then the process 400 proceeds directly to 425. In various examples, the localized user profile can include a set of information corresponding to a particular combination of user information required for a visa application used by a particular country. The set of information can be a subset of the information in the user profile, wherein each element of the localized profile (e.g., name) can reference a corresponding entry in the user profile. Accordingly, the system can populate entries of the localized profile by importing information from the user profile into corresponding entries of the localized profile. In implementations, the chatbot may display or otherwise provide some or all of the information to be imported to the user and ask the user to confirm that such information is correct (e.g., to update residence information). Additionally or alternatively, the system can populate entries of the localized profile by recording pointers (e.g., references) to the corresponding entries of the user profile. Thus, in accordance with aspects of the present disclosure, the system conserves computing resources (e.g., processing time, storage space, and network bandwidth) by reusing pre-established user information that is stored in a user profile to generate a localized profile for a particular destination.

At 425, via the chatbot, the process 400 provides interview questions based on the localized profile updated at 415. For example, using the chatbot to communicate with the user in a conversational fashion, the system can automatically provide questions to the user to complete the localized profile. The system can step through the ordered set of information in the localized profile, and only provide questions to the user corresponding to incomplete or empty entries. Thus, in accordance with aspects of the present disclosure, the system conserves computing resources by only requesting information that has not previously been established to complete a localized profile for a particular destination. For example, based on a user's previous travel, the system may have previously established almost all of the information required by a localized profile. In such case, the system may only use the chatbot to request information for entries that are specially needed by the localized profile and that are unknown (local province name, travel dates, etc.) or may need to be updated (e.g., current address), so as avoid requesting redundant information. Thus, in accordance with aspects of the present disclosure, the system conserves computing resources by reusing pre-established user information in a user profile to complete the localized profile that is specialized for the particular destination. At 429, the system updates the user profile and the localized user profile. At 433, the system determines whether or not the localized profile is complete. If not (i.e., 433, "No"), then the process 400 iteratively returns to 425. If so (i.e., 433, "Yes"), at 437, the system collects payment from the user. Payments can include, for example, application fees, governmental fees, and/or processing fees. At 441, the system generates a travel document (e.g., a travel document 75) based on the localized profile. For example, the system can populate fields of a form (e.g., a visa application retrieved from form information 257) using corresponding entries in the localized profile completed at 433. Each field of the form can be encoded with information referencing a respective entry in the localized profile. At 444, the system provides the travel document to the user (e.g., using a separate communication link 99).

FIG. 5 shows a table depicting an example of a data structure 500 that contains user profile information in accordance with aspects of the present disclosure. The user profile information can be the same or similar to that previously describe herein (e.g., the user profile 253). For each user (e.g., the user 5) of a system (e.g., the artificial intelligence system 30) in accordance with implementations of the present disclosure, the user profile can store data, information, elements, or entries for name, alias, social security number, nationality, citizenship, physical description (e.g., height, weight, gender, etc.), data of birth, age, contact information, residence, etc. Each of these entries can be stored in a cell in a corresponding column of the data structure 500 in association with a unique user identifier (e.g., "User ID").

FIG. 6 shows a table depicting an example of a data structure 600 that contains localized profiles in accordance with aspects of the present disclosure. The data structure 600 contains entries of the user profile that are required for a particular destination (e.g., "Destination AAA"), which can be a particular country, in order to create one or more travel documents that are appropriate for the destination. The entries (e.g., PI-2 and PI-3) can be a subset of the entries in a user profile (e.g., user profile information 500), where the subset includes the information corresponding to or needed for a particular form (e.g., a visa application) for the particular destination. The data structure 600 can also include user information corresponding to the particular destination (e.g., LI-X). For example, the data structure 600 can include user information that describes or records the user's specific travel information with regard to the destination, such as the number of days spent in a country during the previous year.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What we claim is:

1. An artificial intelligence system comprising:
    a processor; and
    one or more computer-readable data storage devices storing program instructions that when executed by the processor, control the artificial intelligence system to perform operations comprising:
        monitoring, via a chatbot of the artificial intelligence system that is remotely executed by a messaging system, a plurality of messaging sessions of a plurality of users communicatively connected to the messaging system by client devices via a communication network;
        determining to converse with a first user of the plurality of users based on one or more keywords used in the messaging session of the first user;
        determining, by conversing with the first user via the chatbot, that a destination of the first user involves a travel document;
        obtaining, by interviewing the first user via the chatbot, information of a localized profile of the first user corresponding to the destination, wherein a plurality of questions provided to the first user during the interview is selected by the artificial intelligence system based on entries in the localized profile;
        generating the travel document using the localized profile; and
        providing the travel document to the first user.

2. The artificial intelligence system of claim 1, wherein the entries in the localized profile are a subset of a user profile maintained by the artificial intelligence system.

3. The artificial intelligence system of claim 1, wherein obtaining the information of the localized profile comprises requesting information including, at least, an identity of the first user, a citizenship of the first user, a residence of the first user, and a destination of the first user.

4. The artificial intelligence system of claim 1, wherein the operations further comprise:
    determining, based on the user information, that a plurality of user profiles stored in a profile library maintained by system do not include a user profile of the first user; and
    creating a new user profile for the first user.

5. The artificial intelligence system of claim 1, wherein the operations further comprise:
    determining that the system does not include the localized profile of the first user for the destination; and
    creating the localized profile.

6. The artificial intelligence system of claim 1, wherein the operations further comprise establishing, via the chatbot, a secure communication channel between the first user and the messaging system.

7. The artificial intelligence system of claim 1, further comprising ending the interview after determining that all the entries of the localized profile are complete.

8. The artificial intelligence system of claim 1, further comprising:
    determining that the first user terminated the interview prior to completing all of the plurality of questions;
    detecting, via the chatbot, the user in a second messaging session; and
    offering, via the chatbot, to resume the interview in the second messaging session.

9. The artificial intelligence system of claim 1, wherein:
    the artificial intelligence system is a part of an online travel system;
    the artificial intelligence system is configured to perform natural language processing of information related to travel;
    the information of the localized profile comprises travel-related information;
    the destination comprises a destination country; and
    the travel document comprises a visa application for the destination country.

10. The artificial intelligence system of claim 1, wherein:
    the localized profile comprises a subset of a general user profile prestored by the artificial intelligence system;
    the travel document is a travel visa for the destination;
    the information of the localized profile corresponds a form for the travel visa for the destination; and
    generating the travel document comprises generating the travel visa using the information of the localized profile and prestored information about the destination.

11. The artificial intelligence system of claim 10, wherein:
    information of the general user profile includes an identifier of the user, a nationality of the user, a citizenship of the user, a physical description of the user, a date of birth of the user, an age of the user, and residence information of the user; and
    the information of the localized profile includes the identifier of the user, the citizenship of the user, the residence information of the user, the physical description of the user, the date of birth of the user, the age of the user, the residence information of the user, and a number of days spent at the destination during a previous year.

12. A method for generating travel documents using an artificial intelligence system, the method comprising:
    monitoring, using a chatbot of the artificial intelligence system remotely executed by a messaging system, a plurality of messaging sessions of a plurality of users communicatively connected to the messaging system by client devices via a communication network;
    determining, using the artificial intelligence system, to converse with a first user of the plurality of users based on one or more keywords used in the messaging session of the first user;
    determining, using the artificial intelligence system by conversing with the first user via the chatbot, that a destination of the first user involves a travel document;
    obtaining, using the artificial intelligence system by interviewing the first user via the chatbot, information of a localized profile of the first user corresponding to the destination, wherein a plurality of questions provided to the first user during the interview is selected by the artificial intelligence system based on entries in the localized profile;
    generating, using the artificial intelligence system, the travel document using the localized profile; and
    providing, using the artificial intelligence system, the travel document to the first user.

13. The method of claim 12, further comprising:
    determining, based on the user information, that a plurality of user profiles prestored in a profile library maintained by system do not include a user profile of the first user; and
    creating a new user profile for the first user.

14. The method of claim 13, further comprising:
    determining that the system does not include the localized profile of the first user for the destination; and
    creating the localized profile using the user profile of the first user.

15. The method of claim 14, further comprising ending the interview after determining that all the entries of the localized profile are complete.

16. The method of claim 12, further comprising:
    determining that the first user terminated the interview prior to completing all of the plurality of questions;
    detecting, via the chatbot, the user in a second messaging session; and
    offering, via the chatbot, to resume the interview in the second messaging session.

17. The method of claim 12, wherein:
    the artificial intelligence system is a part of an online travel system;
    the artificial intelligence system is configured to perform natural language processing of information related to travel;
    the information of the localized profile comprises travel-related information corresponding to the destination;
    the destination comprises a destination country; and
    the travel document comprises a travel visa application for the destination country.

18. The method of claim 17, wherein:
    the localized profile comprises a subset of a general user profile prestored stored by the artificial intelligence system;
    information of the localized profile corresponds a form for the travel visa for the destination country;
    generating the travel document comprises generating the travel visa application using the information of the localized profile and prestored information about the destination.

19. An artificial intelligence system for enhancing on online travel system, the artificial intelligence system comprising:
    a processor; and
    one or more computer-readable data storage devices storing program instructions that when executed by the processor, control the artificial intelligence system to perform operations comprising:
        monitoring, via a chatbot of the artificial intelligence system that is remotely executed by a messaging system, a plurality of messaging sessions of a plurality of users communicatively connected to the messaging system by client devices via a communication network;

determining to converse with a first user of the plurality of users based on one or more keywords used in the messaging session of the first user;

determining, by conversing with the first user via the chatbot, that a destination country of the first user involves a travel visa application;

determining that the one or more data storage devices stores a general user profile of the first user;

creating a localized user profile corresponding to the destination country using information of the general user profile of the first user;

obtaining, by interviewing the first user via the chatbot, information of the localized profile of the first user corresponding to the travel visa application, wherein a plurality of questions provided to the first user during the interview is selected by the artificial intelligence system based on entries in the localized user profile;

generating the travel visa application using the localized profile; and providing, via a communication link, the travel visa application to a client device of the first user.

20. An artificial intelligence system of claim 19, wherein:

information of the general user profile includes an identifier of the user, a nationality of the user, a citizenship of the user, a physical description of the user, a data of birth of the user, an age of the user, and residence information of the user; and the information of the localized profile includes the identifier of the user, the citizenship of the user, the residence information of the user, and a number of days spent at the destination country.

* * * * *